Sept. 18, 1951     G. R. GOODWIN     2,568,495
MANUFACTURE OF FESTOONS

Filed June 1, 1949     3 Sheets-Sheet 1

INVENTOR.
George R. Goodwin
BY Nathaniel Frucht
Attorney

Sept. 18, 1951  G. R. GOODWIN  2,568,495
MANUFACTURE OF FESTOONS
Filed June 1, 1949  3 Sheets-Sheet 2

INVENTOR.
George R. Goodwin
BY Nathaniel Frucht
Attorney

Sept. 18, 1951  G. R. GOODWIN  2,568,495
MANUFACTURE OF FESTOONS
Filed June 1, 1949  3 Sheets-Sheet 3
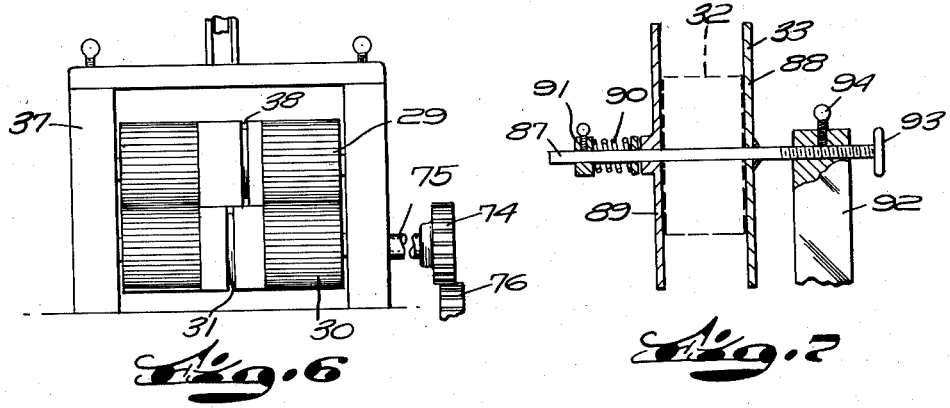
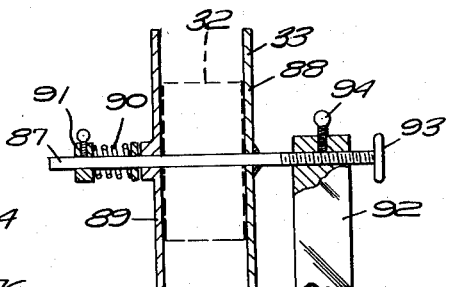
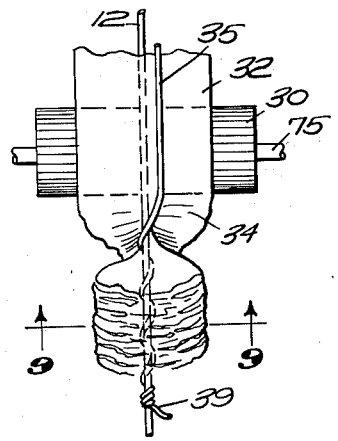
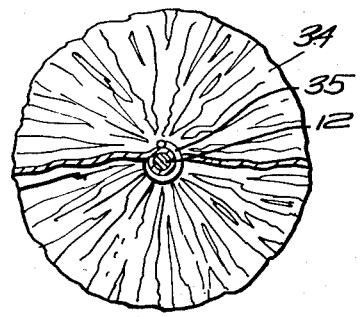
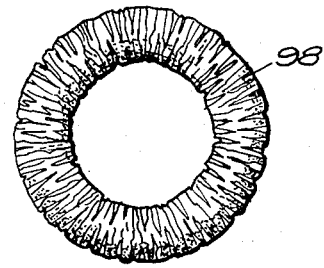
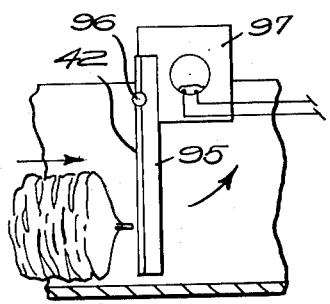
INVENTOR.
George R. Goodwin
BY Nathaniel Frucht
ATTORNEY Patented Sept. 18, 1951

2,568,495

UNITED STATES PATENT OFFICE 2,568,495

MANUFACTURE OF FESTOONS

George R. Goodwin, Attleboro, Mass., assignor to Miller Electric Company, a corporation of Rhode Island Application June 1, 1949, Serial No. 96,422

9 Claims. (Cl. 41—10)

The present invention relates to the manufacture of decorative articles, and has particular reference to the manufacture of festoons, wreaths and garlands.

The principal object of the invention is to improve the manufacture of decorative festoons, wreaths and garlands made of shirred ornamental material.

Another object of the invention is to lock shirred ornamental material to a foundation wire in a novel manner.

A further object of the invention is to provide a novel arrangement for winding and locking shirred ornamental material to a rotating foundation support wire.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 6 is an enlarged view of the shirring rolls on the line 6—6 of Fig. 1, parts being omitted for clearness;

Fig. 7 is a vertical section through the web holding roll and its associated parts;

Fig. 8 is an enlarged detailed view showing the positions of the shirred web, the foundation wire, and the binding wire at the point where the material is locked to the foundation wire;

Fig. 9 is an enlarged sectional view on the line 9—9 of Fig. 8;

Fig. 10 is a detailed view illustrating a preferred form of stop arrangement for periodically stopping the operation of the apparatus after a predetermined length of decorative article has been made; and Fig. 11 shows the article bent into wreath form.

Figure 1:
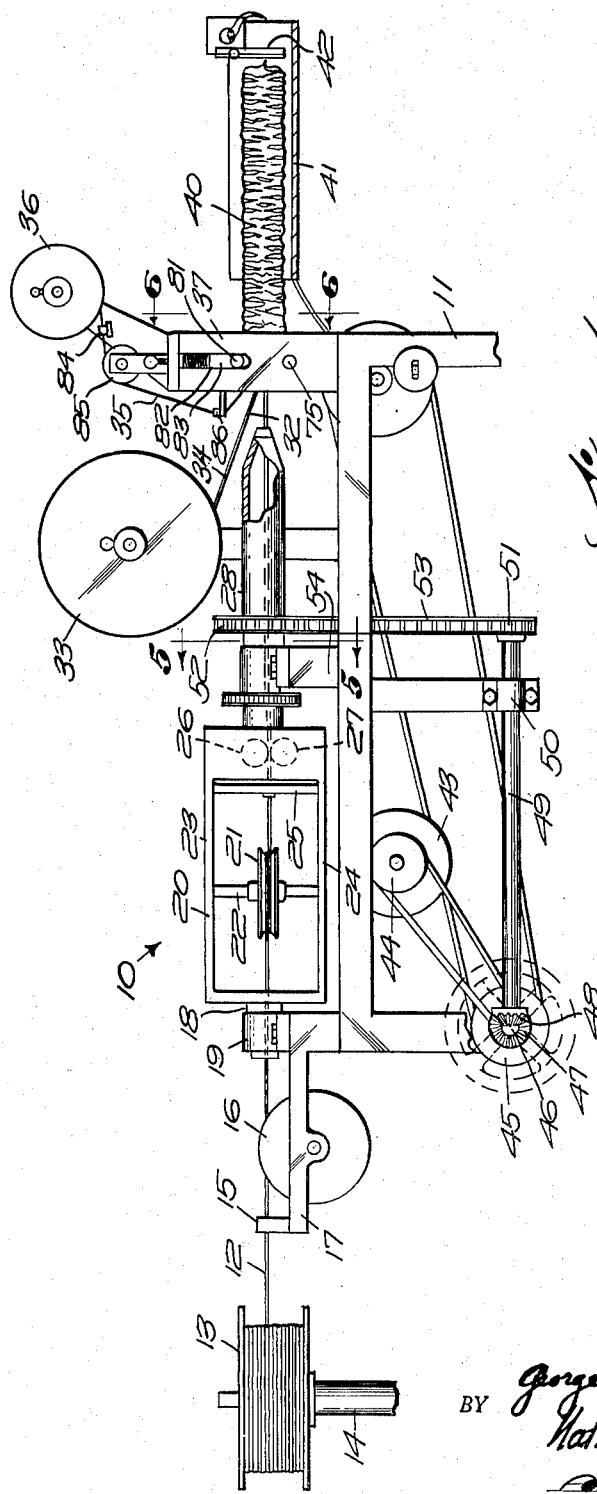
Fig. 1 is a side view of a preferred arrangement of apparatus for manufacturing the improved article, parts being broken away.

In the manufacture of ornamental articles from shirred decorative material, the shirred material is wound helically by positioning the material between two wires, and pulling the two wires and the contained material forwardly while rotating the wires so as to twist lock the material therebetween.

I have devised a novel arrangement, whereby I use a heavy foundation wire which is rotated and simultaneously advanced; decorative material extends over the rotating advancing wire, and is wound around the foundation wire and is helically wound thereon over the material as the rotating foundation wire advances. Since the foundation wire is not pulled, but freely advances, the length of the formed decorative article is independent of the size of the apparatus, and is limited only by the space available for manufacture. In practice I have found it convenient to cause a desired advance of the foundation wire to operate an electrical switch, whereby the operation of the machine is stopped to permit cutting of the formed decorative article, the stop mechanism being arranged to automatically start operating again after cutting. I contemplate mounting an automatically actuated knife of the guillotine type adjacent the forward end of the apparatus, to be automatically actuated to cut off predetermined lengths, and to operate when the machine is automatically stopped by the stop mechanism.

Referring to the drawings, the apparatus 10 includes a suitable base 11 on which the operating parts are mounted. Heavy foundation wire 12 is drawn from a wire supply reel 13 which is rotatably mounted on a suitable fixed support 14, and the foundation wire 12 passes through a fixed guide 15 and around an idler pulley 16, the idler pulley 16 and the guide 15 being mounted on an extension 17 secured to and extending rearwardly of the base 11. The foundation wire 12 passes through a hollow shaft 18 rotatably mounted in a suitable bearing 19, and extends into a shirl 20 of box form and around a whirl pulley 21 which is rotatably mounted on a cross shaft 22 extending between the two sides 23, 24 of the whirl. The two pulleys limit back twist of the foundation wire.

Figure 4:
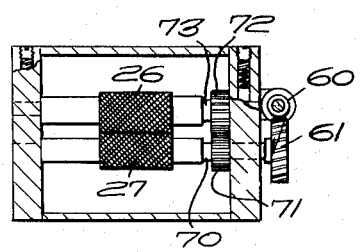
Fig. 4 is an enlarged section on the line 4—4 of Fig. 1.
Figure 5:
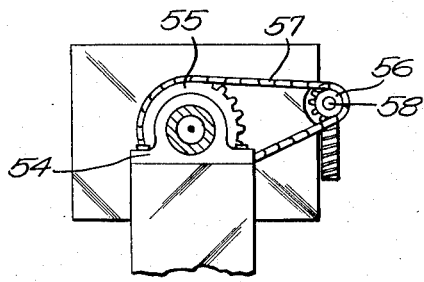
Fig. 5 is a side view of the operating mechanism for the feed rolls of Fig. 4.

The foundation wire 12 now passes through a suitable opening in a guide plate 25 and between two feed rolls 26, 27 which are knurled or otherwise indented as shown in Fig. 4 to firmly grip the wire, the rolls 26, 27 rotating forwardly to positively feed the wire through a longitudinally extending guide tube 28, whereby the foundation wire rotates as it moves forwardly. The forwardly moving foundation wire now freely passes between two shirring rolls 29, 30, through an annular recess 31 formed in the lower roll 30, the rolls 29, 30 preferably having shirring edges and intermediate cylindrical surfaces.

Ornamental material such as a flat colored Cellophane strip 32 is drawn from a suitable supply reel 33, and between the shirring rolls 29, 30, which rotate forwardly, whereby the decorative material is shirred to form a decorative web or strip 34 and advances to overlie the rotating forwardly moving foundation wire. A binding wire 35 is drawn from a binding wire reel 36, suitably mounted on the base 11 and preferably on the shirring roll housing 37, the binding wire 35 passing between the shirring rolls in superimposed relation to the decorative material and extending through an annular channel 38 in the upper shirring roll 29. The annular channel 38 is laterally displaced with respect to the annular channel 31 for the foundation wire, as illustrated in Fig. 6, the relative positions of the foundation wire, the shirred web 33, and the binding wire 35 being shown in Fig. 8. It is initially necessary to twist the end of the binding wire around the foundation wire as shown in 39 in Fig. 8, but this is not necessary thereafter, as the knurled rolls impart a roughened surface to the foundation wire, to provide a firm locking base.

As the rotating foundation wire advances, the binding wire is helically wound thereon, the space between the windings varying in accordance with the speed of forward movement of the foundation wire; the amount of decorative web which is bound to the foundation wire by the binding wire is controlled by regulating the speed of the shirring rolls, which feed the shirred web forwardly at a desired rate to provide a desired fullness of decorative material around the foundation wire. The resulting decorative article, which is designated 40 in Fig. 1, progressively advances in a trough-like container 41, secured to and extending forwardly from the base 11, until the forward end of the foundation wire contacts a movable switch arrangement 42 for breaking the electrical line circuit to the apparatus.

Figure 2:
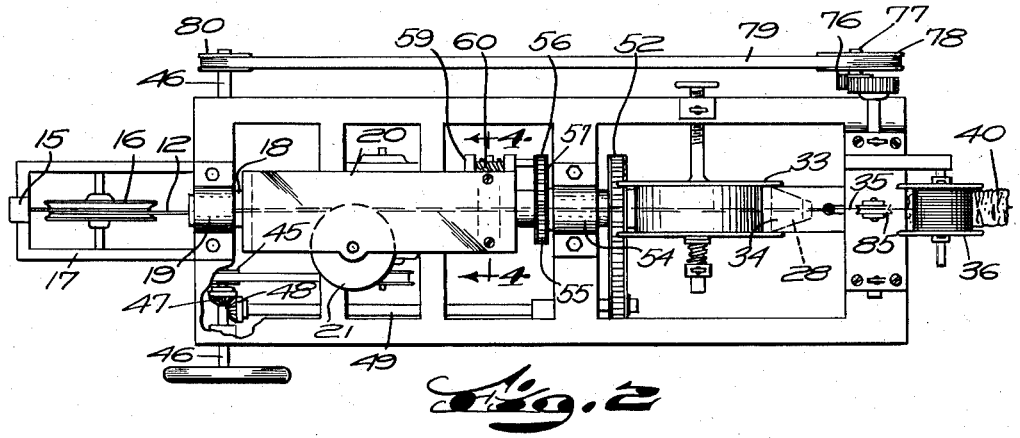
Fig. 2 is a top plan view of Fig. 1, parts being broken away.
Figure 3:
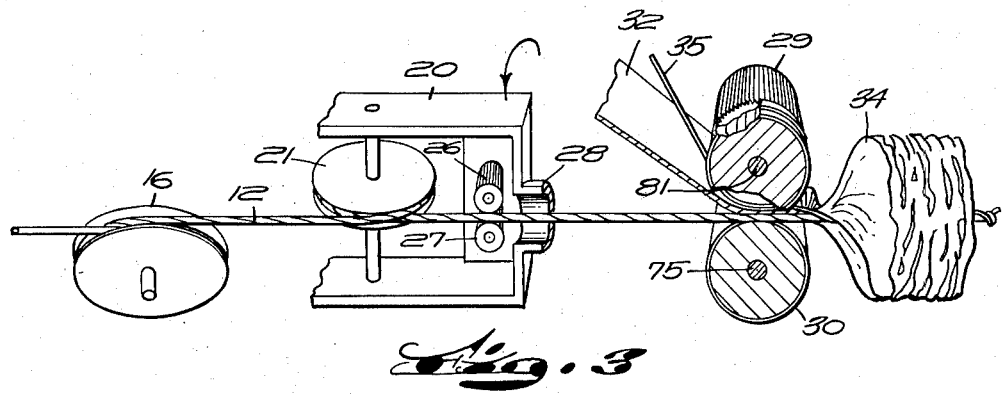
Fig. 3 is a diagrammatic view showing the relative positioning of the essential parts of the apparatus.

The operating apparatus, see Figs. 1 and 2, includes an electrical motor 43, which is actuated by suitable line current, having a power pulley 44 for belt-driving a pulley 45 keyed to a cross shaft 46 which is rotatably mounted in the base 11. The cross shaft 46 has a bevelled end gear 47 mounted thereon and meshing with a bevelled end gear 48 keyed to a transverse shaft 49, suitably mounted in bearing supports 50 secured to the base 11, the shaft 49 having an end sprocket 51 and driving a second sprocket wheel 52 through a chain 53, the sprocket wheel 52 being keyed to the guide tube 28 which is rotatably supported on a bearing stand 54. A sprocket wheel 55 is rotatably mounted on the tube 28 and fixed to the base 11, to impart rotation to a small sprocket wheel 56 through a chain 57, the sprocket wheel 56 being keyed to a stub shaft 58 which is rotatably mounted in bearings 59 in the whirl, and which carries a worm 60, the worm 60 meshing with a worm gear 61 keyed to the shaft 70 of the lower feed roll 27. The shaft 70 has a spur gear 71 keyed thereon which meshes with a second spur gear 72 keyed to the shaft 73 of the upper feed roll 26, whereby positive forward actuation of the feed rolls 26, 27 is obtained.

The lower shirring roll 31 is power driven by a gear 74 keyed to its shaft 75, which is rotatably mounted in the housing 37, the gear 74 being engaged by a gear 76 on a stub shaft 77 which has a pulley 78 keyed thereto and driven by a belt 79 from a pulley 80 keyed to the end of the cross shaft 46. The upper shirring roll 29 is keyed to an axial shaft 81 slidably rotatably received in vertical slots 82 in the sides of the shirring roll housing 37, and suitably tensioned into contact engagement with the lower roll 30 by regulated spring pressed plugs 83.

The binding wire 35 preferably passes through a fixed guide 84, over an idler pulley 85 mounted in the housing 37 and a second fixed guide 86, for alignment with the annular channel 38 in the upper shirring roll 29.

Referring to Fig. 7, the decorative material 33 is rotatably mounted on the cross shaft 87 of the supply reel 34, one side 88 being secured as by welding to the cross shaft and the other side 89 being slidably mounted thereon and spring pressed inwardly by a suitable tension spring 90 and an adjustable lock block 91 mounted on the cross shaft, which is threadedly mounted in a suitable threaded bearing 92 secured to the base 11, and is movable by means of a hand wheel 93 and locked in place by a lock screw 94 to properly position the decorative material 33 with respect to the foundation wire 12, so as to be centered as it advances to overlie the foundation wire.

Referring now to Fig. 10, the stop switch arrangement 42 includes a movable arm 95 which is swingingly mounted at its upper end on a pivot pin bearing 96 and includes a mercury contact device 97 whereby tilting the arm 95 opens the line connection to the motor 43 and stops the apparatus. When a desired length of the decorative article is cut and removed from the trough 41 the arm 95 swings downwardly again and closes the line circuit for the electric motor 43. The decorative article may be left in extended form, or may be bent into wreath form as indicated at 98 in Fig. 11.

The invention thus comprises the imparting of a rotary movement to a foundation wire while advancing the foundation wire, the preparation of an ornamental web in a desired manner, which preferably is by shirring, but which may obviously consist of crimping, slitting, feathering or the like, the feeding of the prepared ornamental web to overlie the rotating advancing wire, and the locking of the ornamental web to the foundation wire by means of a binding wire which is wrapped with the ornamental web around the foundation wire in helical form. The web is axially aligned with the foundation wire, and the binding wire is preferably drawn from a point which is laterally displaced from the axis of the foundation wire and the web, to fix the binding point beyond the shirring rolls and thus prevent any slitting or cutting action on the web.

I have described the use of a foundation wire and a binding wire which winds around the foundation wire to bind a shirred decorative web to the foundation wire. It is preferred to use metal wire, but it may be desirable to use non-metallic wires, for example, plastic wires or textile cords, for decorative effects. I also contemplate use of two or more binding wires, at least one of which may be of plastic or textile material, one suggested manner of using a second binding wire being to provide a supplemental annular groove in the lower shirring roll in alignment with the annular groove in the upper shirring roll, whereby both binding elements are initially out of line with the rotating foundation element.

Although I have disclosed a specific construction of apparatus for carrying out the novel manufacture, it is obvious that changes in the size, shape and arrangement of the operating parts, and in the size, shape and ornamentation of the ornamental web, may be made to provide ornamental articles of desired appearance, without departing from the spirit and the scope of the invention as defined in the appended claims.

I claim:

1. The method of making a decorative article, comprising the steps of rotating a foundation wire axially while linearly advancing the foundation wire, then feeding a decorative web forwardly to overlie the advancing rotating foundation wire, and then feeding a binding wire to the web and foundation wire for winding helically on the foundation wire and binding the web thereto.

2. The method of making a decorative article, comprising the steps of rotating a foundation wire axially while linearly advancing the foundation wire, then feeding a decorative web forwardly to axially overlie the advancing rotating foundation wire, and then feeding a binding wire to the web and foundation wire for winding helically on the foundation wire and binding the web thereto.

3. The method of making a decorative article, comprising the steps of rotating a foundation wire axially while linearly advancing the foundation wire, then feeding a decorative web forwardly to axially overlie the advancing rotating foundation wire, and then feeding a binding wire to the web and foundation wire at an angle to the foundation wire axis for winding helically on the foundation wire and binding the web thereto.

4. Apparatus of the kind described, comprising wire feeding means for supplying a foundation wire, means for receiving the fed wire and rotating the fed wire axially, means for feeding the rotating wire linearly forwardly, means for feeding a decorative web to overlie the forwardly fed rotating foundation wire, and means for feeding a binding wire to the forwardly rotating foundation wire to wind helically on the foundation wire and bind the decorative web thereto.

5. Apparatus of the kind described, comprising wire feeding means for supplying a foundation wire, means for receiving the fed wire and rotating the fed wire axially, means for feeding the rotating wire linearly forwardly, means for feeding a decorative web to axially overlie the forwardly fed rotating foundation wire, and means for feeding a binding wire to the forwardly rotating foundation wire to wind helically on the foundation wire and bind the decorative web thereto.

6. Apparatus of the kind described, comprising wire feeding means for supplying a foundation wire, means for receiving the fed wire and rotating the fed wire axially, means for feeding the rotating wire linearly forwardly, means for feeding a decorative web to axially overlie the forwardly fed rotating foundation wire, and means for feeding a binding wire to the forwardly rotating foundation wire at an angle to the foundation wire axis to wind helically on the foundation wire and bind the decorative web thereto.

7. Apparatus of the kind described, comprising wire feeding means for supplying a foundation wire, means for receiving the fed wire and rotating the fed wire axially, means for feeding the rotating wire linearly forwardly, means for limiting rearward twist of the rotating foundation wire, means for feeding a decorative web to axially overlie the forwardly fed rotating foundation wire, and means for feeding a binding wire to the forwardly rotating foundation wire to wind helically on the foundation wire and bind the decorative web thereto.

8. In an apparatus of the type described, a supply reel, a whirl device receiving the foundation wire from the supply reel and rotating the foundation wire axially while advancing the foundation wire linearly, mechanism for limiting reverse twist of the foundation wire, a decorative web supply reel, two cooperating feed rolls for feeding decorative web from the decorative web supply reel to overlie the rotating advancing foundation wire, a binding wire supply reel, and means for feeding binding wire from the binding wire supply reel to the rotating advancing foundation wire to wind helically on the foundation wire and bind the decorative web thereto.

9. In an apparatus of the type described, a supply reel, a whirl device receiving the foundation wire from the supply reel and rotating the foundation wire axially while advancing the foundation wire linearly, mechanism for limiting reverse twist of the foundation wire, a decorative web supply reel, two cooperating feed rolls for feeding decorative web from the decorative web supply reel to overlie the rotating advancing foundation wire, a binding wire supply reel, and means for feeding binding wire from the binding wire supply reel to the rotating advancing foundation wire to wind helically on the foundation wire and bind the decorative web thereto, one of said feed rolls having an annular groove for the passage of the foundation wire, and the other feed roll having an annular groove for the passage of the binding wire.

GEORGE R. GOODWIN.

REFERENCES CITED

The following references are of record in the file of this patent:

UNITED STATES PATENTS

| Number | Name | Date |
| --- | --- | --- |
| 1,216,580 | Levi | Feb. 20, 1917 |
| 1,683,223 | Wilson | Sept. 4, 1928 |
| 2,112,723 | Wisoff | Mar. 29, 1938 |
| 2,131,893 | Jessen | Oct. 4, 1938 |
| 2,157,583 | Wisoff | May 9, 1939 |
| 2,197,615 | Kelman | Apr. 16, 1940 |
| 2,234,338 | Franke | Mar. 11, 1941 |
| 2,248,572 | Kelman | July 8, 1941 |
| 2,335,219 | Abramson | Nov. 23, 1943 |
| 2,414,378 | Kelman | Jan. 14, 1947 |